UNITED STATES PATENT OFFICE.

FRITZ HOFMANN AND CARL COUTELLE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

PRODUCTION OF CAOUTCHOUC SUBSTANCES.

1,113,631. Specification of Letters Patent. Patented Oct. 13, 1914.

No Drawing. Application filed October 29, 1912. Serial No. 728,510.

*To all whom it may concern:*

Be it known that we, FRITZ HOFMANN and CARL COUTELLE, doctors of philosophy, chemists, citizens of the German Empire, residing at Elberfeld, Germany, have invented new and useful Improvements in the Production of New Caoutchouc Substances, of which the following is a specification.

We have discovered that there are a number of polyhydroxy organic substances which favorably influence the polymerization of butadiene and its homologues and substitution products (isoprene, piperylene, diisopropenyl, etc.), caoutchouc substances being thus obtainable even at ordinary temperatures; and the present invention relates to the manufacture and production of such caoutchouc substances from such hydrocarbons under the influence or with the addition of such polyhydroxy organic substances. As such polyhydroxy organic substances which favorably influence the polymerization reaction may be mentioned the carbohydrates, sugar and starch, (monoses, dioses and polyoses) such as invert sugar, maltose, arabinose, soluble starch, maize starch, rice starch, wheat starch, potato starch, etc., glycol, gylcerin, erythritol, glycogen, arrow root, tragacanth, gum arabic, etc. It has been found advantageous to use these polyhydroxy compounds alone or as mixtures.

In order to illustrate the invention more fully the following examples are given, the parts being by weight:—I. 100 parts of beta-gamma-dimethyl-butadiene are mixed with 1 to 2 parts of wheat starch, and the mixture is allowed to stand for some months in a closed vessel. A whitish solid caoutchouc substance is thus obtained. Other polyhydroxy organic substances such as those above mentioned can be used in a similar manner, as well as other hydrocarbons e. g. isoprene, erythrene, etc.

Instead of the specific hydrocarbons or mixtures of the foregoing examples, other hydrocarbons can be used, e. g. the homologues and derivatives of butadiene, such as alpha-methyl-butadiene, alpha-alpha-dimethyl-butadiene, beta-propylbutadiene, beta-isobutyl butadiene, as well as the hydrocarbons hereinbefore mentioned and mixtures of them or other butadiene derivatives. The reaction can also be carried out in the presence of non-reactive solvents and diluents, such as benzene, ether, petroleum ether, solvent naphtha, etc. Heating also accelerates the polymerization. Futhermore the polyhydroxy organic substances already mentioned can be used alone or as mixtures or with the addition of other agents such as nitrogeneous organic substances, etc., as already described.

The present application is in part a continuation of our prior application Serial No. 652,641, filed October 3, 1911, in which the process of polymerization using urea or its equivalents, is claimed. The process of polymerization using nitrogeneous oxygen-containing organic substances is claimed in our copending application Serial No. 728,511.

We claim:—

1. The process of producing caoutchouc substances which comprises polymerizing butadiene hydrocarbons by means of a small amount of a polyhydroxy organic substance as the effective polymerizing agent.

2. The process of producing caoutchouc substances which comprises polymerizing butadiene hydrocarbons by means of a small amount of carbohydrate as the effective polymerizing agent.

3. The process of producing caoutchouc substances which comprises polymerizing butadiene hydrocarbons by means of a polyose as the effective polymerizing agent.

4. The process of producing caoutchouc substances which comprises polymerizing butadiene hydrocarbons by means of a starch as the effective polymerizing agent.

5. The process of producing caoutchouc substances which comprises polymerizing butadiene hydrocarbons in the presence of less than 5% of polyhydroxy organic substance.

6. The process of producing caoutchouc substances which comprises polymerizing butadiene hydrocarbons in the presence of less than 5% of a carbohydrate.

7. The process of producing caoutchouc substances which comprises polymerizing butadiene hydrocarbons in the presence of less than 5% of starch.

In testimony whereof we have hereunto set our hands in the presence of two subscribing witnesses.

FRITZ HOFMANN. [L. S.]
CARL COUTELLE. [L. S.]

Witnesses:
HELEN NUFER,
ALBERT NUFER.